J. H. VOORHEES.
Inside Blinds.

No. 146,414.  Patented Jan. 13, 1874.

WITNESSES:
E. Wolff
D. Sedgwick

INVENTOR:
J. H. Voorhees
BY
ATTORNEYS.

UNITED STATES PATENT OFFICE.

JOHN H. VOORHEES, OF WILLIAMSBURG, NEW YORK, ASSIGNOR TO HARDY AND VOORHEES, OF SAME PLACE.

IMPROVEMENT IN INSIDE BLINDS.

Specification forming part of Letters Patent No. 146,414, dated January 13, 1874; application filed December 1, 1873.

*To all whom it may concern:*

Figure 1:
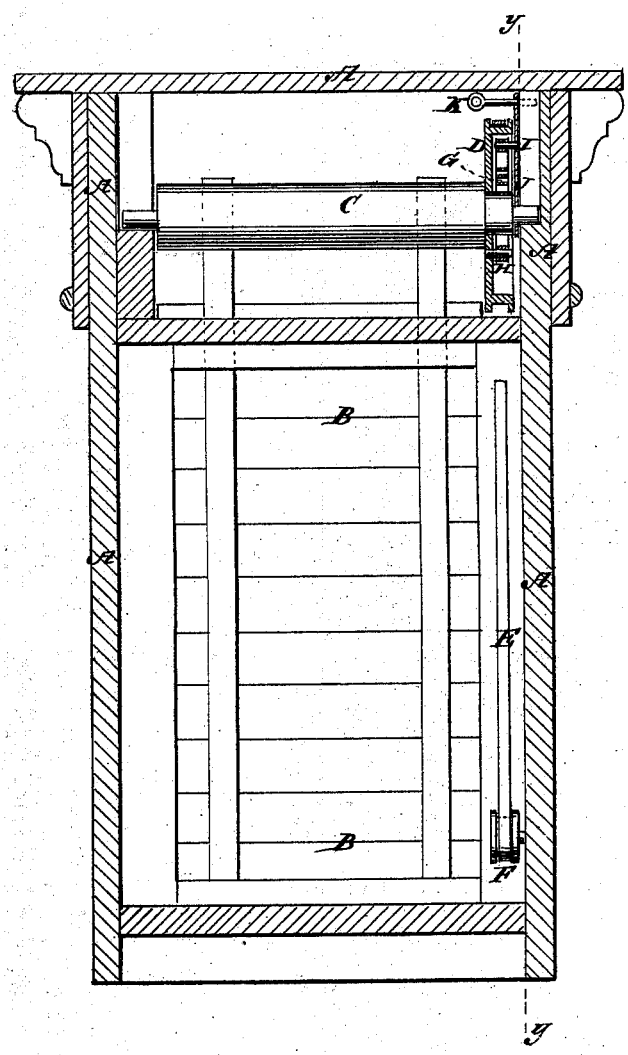
Figure 2:
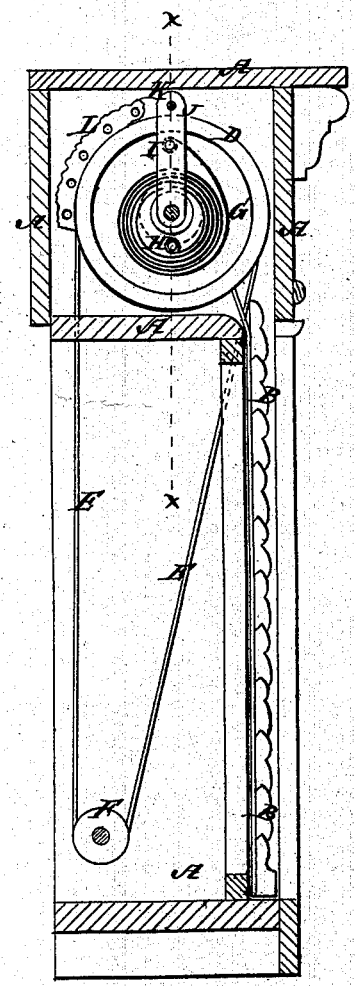

Be it known that I, JOHN H. VOORHEES, of Williamsburg, in the county of Kings and State of New York, have invented a new and useful Improvement in Rolling-Shutter Counter-Balance, of which the following is a specification:

Figure 1 represents the inner side of a rolling shutter to which my improvement has been applied, partly in section, through the line $x\,x$, Fig. 2; and Fig. 2 is a side view of the same, partly in section, through the line $y\,y$, Fig. 1.

My invention has for its object to furnish an improved rolling shutter which shall be simple in construction, will cause no additional expense, will require no additional space, will prevent the possibility of the shutter "going down with a run," and will enable the shutter to be raised and lowered with a slight outlay of power. The invention consists in the construction and arrangement of parts, as hereinafter described, and indicated in the claims.

A represents the casing of the window or door. B is the shutter, and C is the roller upon which the shutter is rolled, and which is pivoted to the casing A in the ordinary manner. To one end of the roller C is attached a pulley, D, around which is passed an endless belt, E, which also passes around a small pulley, F, pivoted to the lower part of the casing A, and by means of which the shutter B is wound upon and unwound from the roller C. The outer side of the pulley D is recessed to receive the spring G, which is coiled around the pivot of the roller C. The inner end of the spring G has an eye formed upon it, which is slipped over a pin, H, attached to the pulley D near its center. The outer end of the spring G has an eye formed upon it, which is slipped over a pin, I, attached to a lever, J. The inner end of the lever J has a hole formed in it to receive the pivot of the roller C, which thus serves as a pivot or fulcrum to the lever. The outer end of the lever J has a hole formed in it to receive a pin, K, which is inserted in one of a series of holes, L, formed in the casing A, to hold the lever in place when adjusted.

The tension of the spring G is regulated by turning the lever J around its pivot. The spring G is so arranged as to be wound up by the descent of the shutter B, and to be fully wound up when the said shutter has been fully lowered.

By this arrangement, the spring G increases in strength as the shutter descends, so as to be always about equal to the weight to be supported, so as to always balance the said weight, and thus enable the shutter to be raised and lowered with a very slight outlay of power.

Having thus described my invention, I claim as new, and desire to secure by Letters Patent—

1. The combination of the spring G, lever J, and pins H I with the pulley D and roller C of a rolling shutter, substantially as herein shown and described.

2. The combination of the pulley D, spring G, roller C, the lever J, pin K, and bar or casing, provided with holes L to receive said pin, and thus provide for regulating the tension of the spring, as shown and described.

JOHN H. VOORHEES.

Witnesses:
 WM. E. FORT,
 W. S. WANDEL.